Sept. 16, 1924.  P. C. POCOCK ET AL  1,508,937

METER

Filed Nov. 4, 1921  3 Sheets-Sheet 1

INVENTORS.
PAUL C. POCOCK.
AUGUSTINE J. POCOCK.
By
Attorney

Sept. 16, 1924.  P. C. POCOCK ET AL  1,508,937

METER

Filed Nov. 4, 1921  3 Sheets-Sheet 2

INVENTORS.
PAUL C. POCOCK.
AUGUSTINE J. POCOCK.

By

Attorney

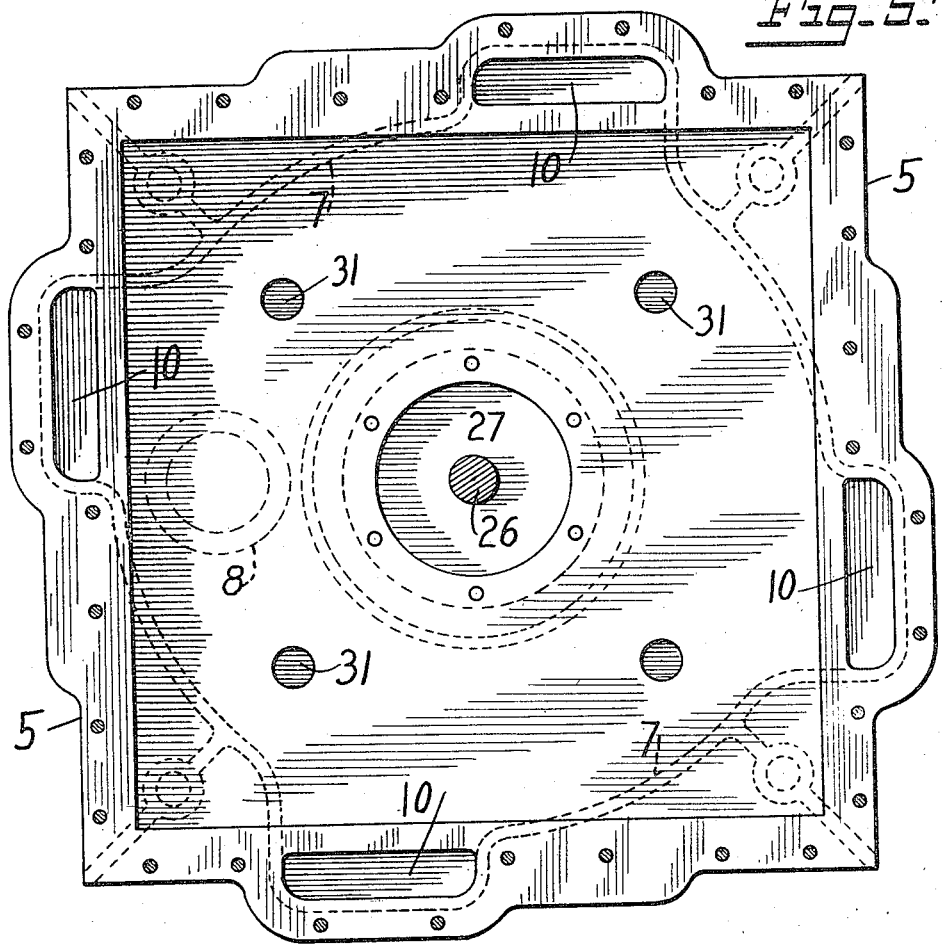
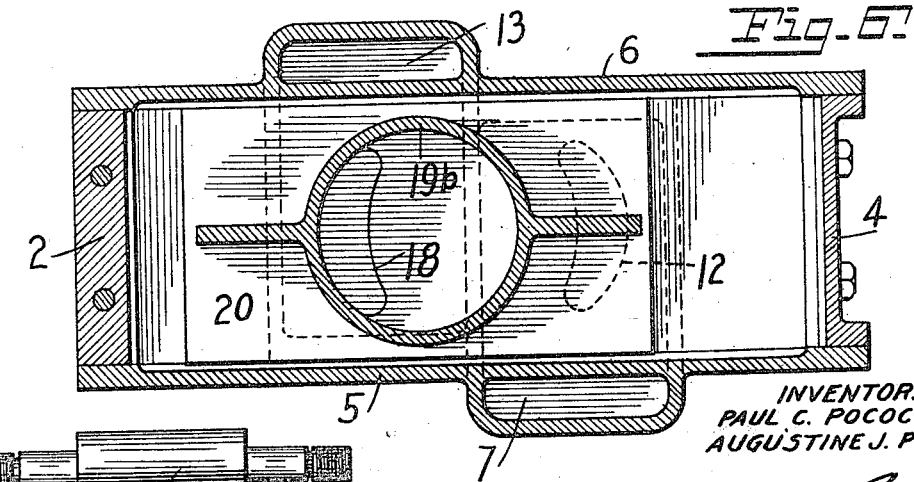

Patented Sept. 16, 1924.

1,508,937

UNITED STATES PATENT OFFICE.

PAUL C. POCOCK, OF SIDNEY, AND AUGUSTINE J. POCOCK, OF DAYTON, OHIO, ASSIGNORS, BY DIRECT AND MESNE ASSIGNMENTS, TO THE MICRO METER COMPANY, OF SIDNEY, OHIO, A CORPORATION OF OHIO.

METER.

Application filed November 4, 1921. Serial No. 512,795.

*To all whom it may concern:*

Be it known that we, PAUL C. POCOCK and AUGUSTINE J. POCOCK, both citizens of the United States, residing, respectively, at Sidney, county of Shelby, State of Ohio, and Dayton, county of Montgomery, State of Ohio, have invented certain new and useful Improvements in Meters, of which the following is a specification, reference being had therein to the accompanying drawings.

This invention relates to a meter for measuring fluids and more particularly for measuring liquids.

One object of the invention is to provide a meter which will accurately measure the liquid passing through the same.

A further object of the invention is to provide such a meter which will require but little power for its operation.

A further object of the invention is to provide such a meter which will be simple in its construction and operation and which can be produced at a relatively low cost.

Other objects of the invention will appear as the device is described in detail.

Figure 1:
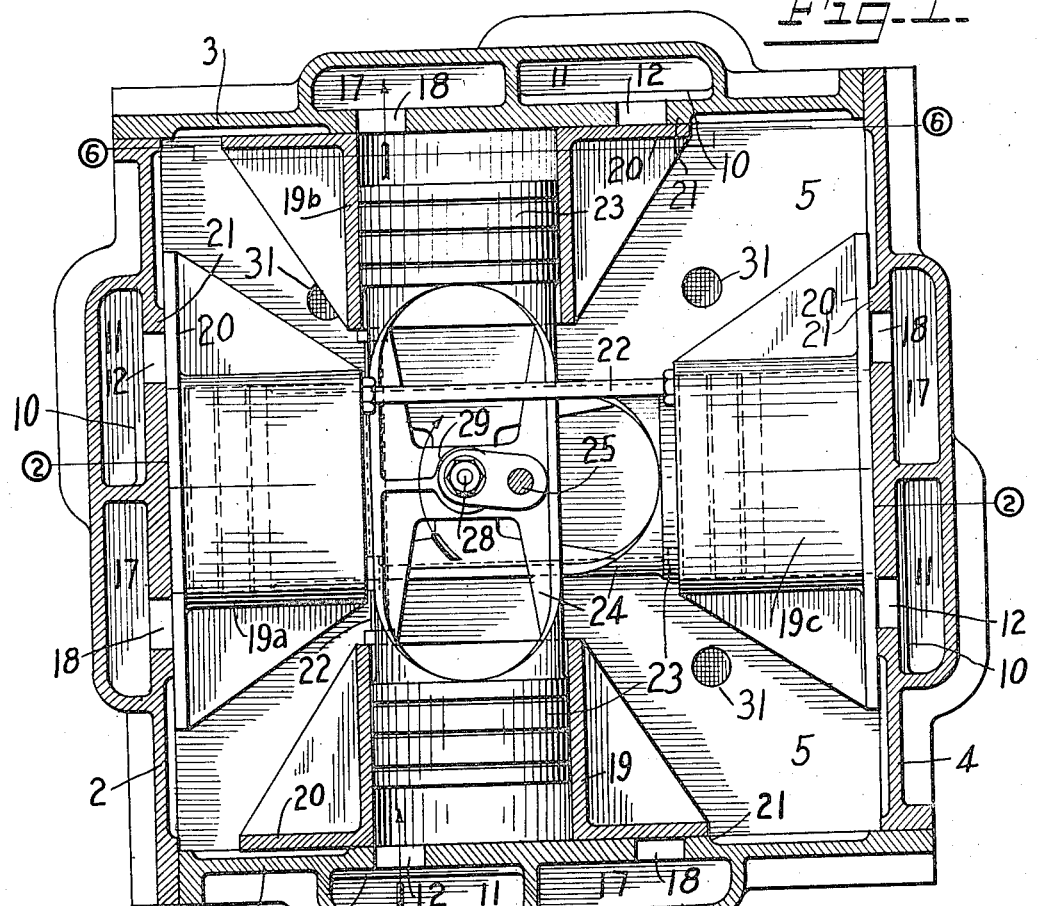
Figure 2:
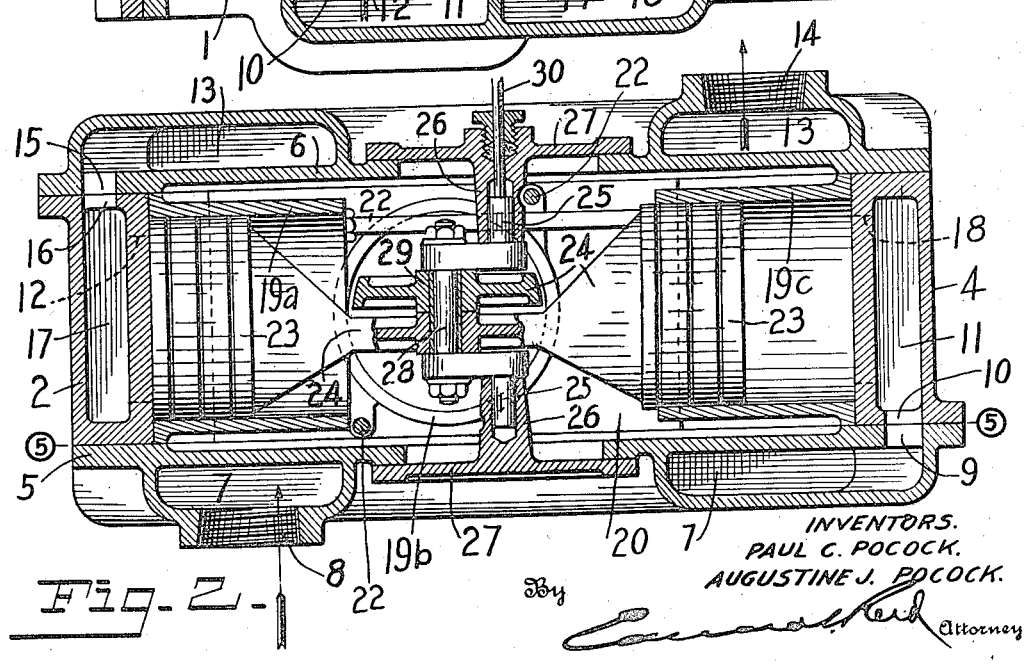
Figure 3:
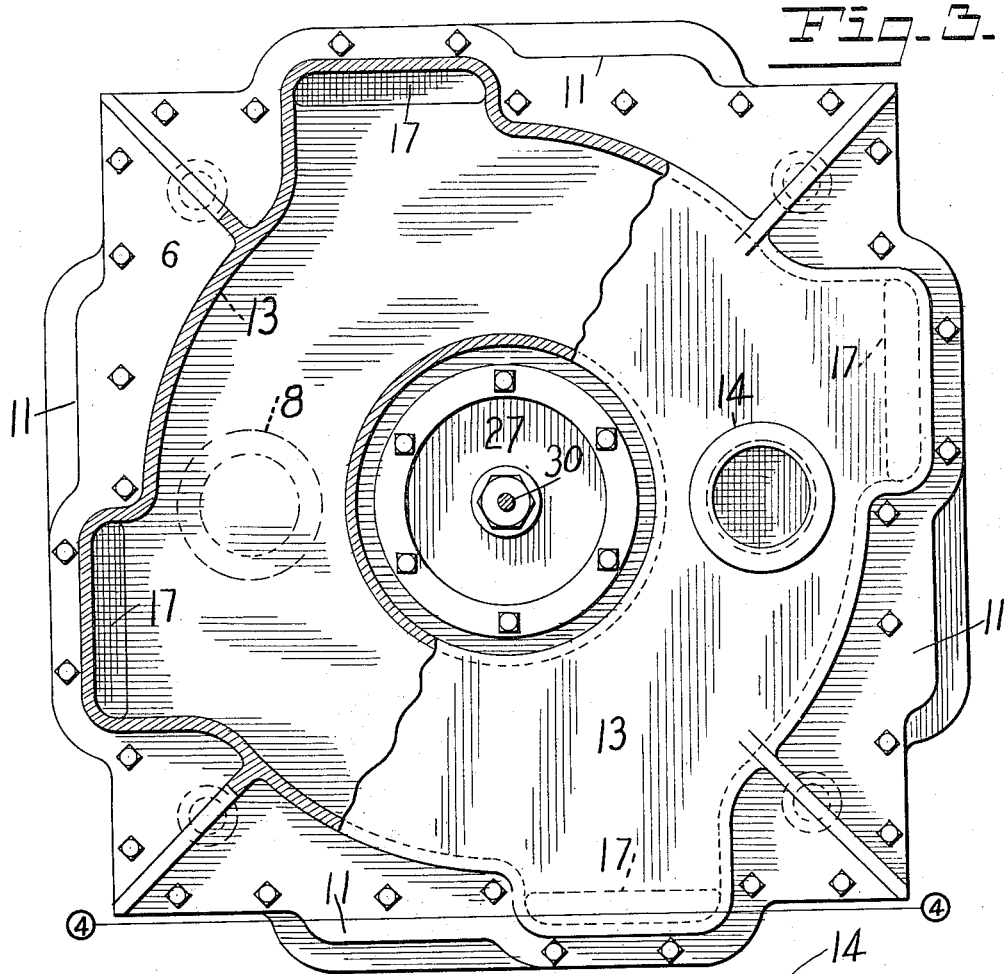
Figure 4:
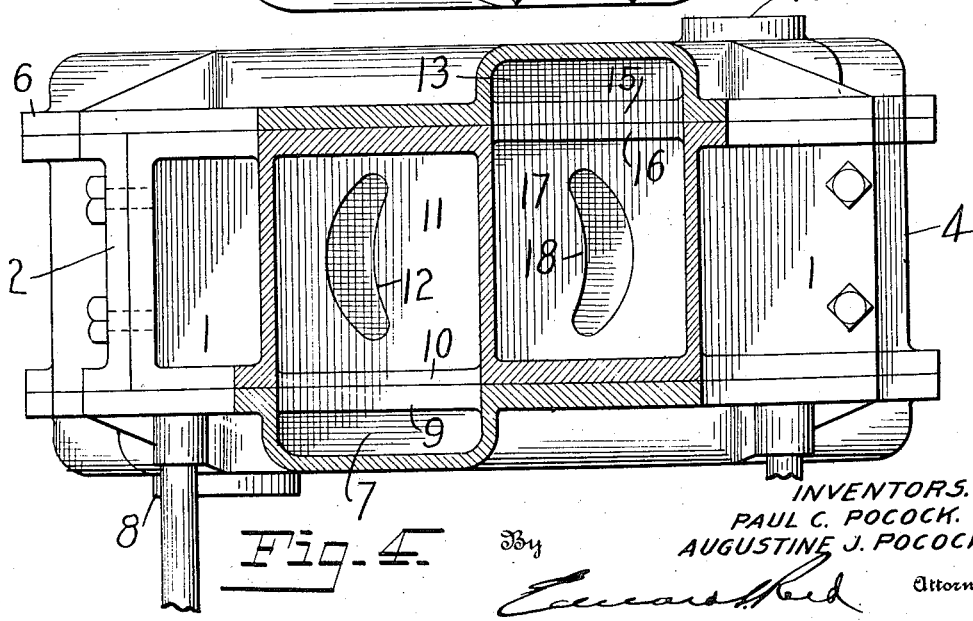
Figure 4:

In the accompanying drawings Fig. 1 is a horizontal sectional view taken centrally through a meter embodying our invention; Fig. 2 is a section taken on the line 2—2 of Fig. 1; Fig. 3 is a top plan view of the meter partly broken away; Fig. 4 is a section taken on the line 4—4 of Fig. 3; Fig. 5 is a detail view of the bottom plate; Fig. 6 is a sectional view taken on the line 6—6 of Fig. 1; and Fig. 7 is a detail view of the eccentric connecting pin.

In these drawings we have illustrated one embodiment of our invention but it will be understood that this has been shown for the purposes of illustration only and that the meter may take various forms without departing from the spirit of the invention.

In that embodiment of the invention here illustrated the meter comprises a casing which may be of any suitable construction and which is preferably rectangular in form and is here shown as comprising four side walls, 1, 2, 3 and 4 which are rigidly connected one to the other at their adjacent edges. Secured to the upper and lower edges of the side walls is a bottom plate 5 and a top plate 6 which serve to completely close the interior of the casing. The top and bottom walls are preferably hollow, that is, they are provided with channels, which may extend entirely about the same, and are adapted to communicate with channels in the side walls. As here shown, the channel 7 in the bottom plate 1 extends entirely about that plate, has an inlet 8 to connect it with a source of supply, and is provided with a series of laterally offset portions having ports 9 which communicate with ports 10 in the lower edges of the respective side member of the casing. The ports 10 communicate with channels 11 in the respective side walls, which in turn have in their inner walls ports 12 leading to the interior of the casing. The channel 13 of the top plate 6 is provided with an outlet port 14 and is similar in arrangement and construction to the channel in the bottom plate 7. If desired, the top and bottom plates may be identical in form and interchangeable one for the other. The ports 15 of the offset portions of the channel 13 communicate through ports 16 with channels 17 formed in the side walls of the casing alongside of and separated from the channels 11. The channels 17 are also connected with the interior of the casing by means of ports 18. It will be noted that the inlet channel 11 in one side member is directly opposite the outlet channel 17 in the other side member. Further, it will be noted that the side members are identical in construction and interchangeable and that they are assembled by causing one end of each side member to overlap the end of an adjacent side member, the overlapping edges being rigidly connected one to the other by screws or the like.

Mounted within the casing are a plurality of measuring devices, each of which consists of a cylinder 19 open at both ends and having at its outer edge a relatively wide base, consisting of laterally extending flanges 20, which has sliding bearing upon the inner face of one of the side frame members 1. Preferably each side member has a raised portion, or a boss 21 with which the base of the cylinder has sliding contact and in which the inlet and outlet ports 12 and 18 are formed. These ports are preferably curved to conform substantially to the curvature of the cylinder so that as the latter is shifted from one position to another the ports will be opened or closed quickly. The ports are spaced apart such a distance that only one of them can register with the open end of the cylinder at any given time. When the cylinder is in an intermediate position both ports will be closed. See Fig. 1. In the present construction there are four of these cylinders, which I have indicated as 19, 19ª, 19ᵇ and 19ᶜ, one for each side wall, and the opposite cylinders are connected one to the other in pairs. As here shown connecting rods 22 extend between the inner ends of the cylinders of each pair and hold them firmly in contact with the inner surfaces of the side walls and cause them to move simultaneously in a direction transverse to their axes, whereby when one cylinder of a pair is moved out of communication with its inlet port and into communication with its outlet port the other cylinder of that pair will be moved out of communication with its outlet port and into communication with its inlet port. Mounted in each cylinder is a piston 23 and the pistons of each pair of cylinders are secured one to the other by connecting members, or tie plates, 24, which maintain the pistons in such relation one to the other than when one of them is in its innermost position the other will be in its outermost position. Consequently, when liquid under pressure is admitted to that cylinder in which the piston is in an outer position the piston will be forced inwardly and its companion piston, in the other cylinder of the same pair, will be forced outwardly, thus discharging any liquid contained within the last mentioned cylinder. While we have shown the present mechanism as driven by the pressure of liquid which is being measured, it will be obvious that the operation would be the same if the power were derived from another source.

The movement of the pistons in one pair of cylinders serves to shift the other pair of cylinders to reverse their connections with the respective inlet and outlet ports. To accomplish this we have, in the present instance, provided a crank shaft 25, the end portions of which are journaled in bearings 26 carried by plates 27 rigidly secured to the bottom and top members 5 and 6. The arms of this crank shaft are connected by a bolt, or pin, 28 which extends through bearings 29 in the two connecting members 24 for the respective pairs of pistons. If desired the pin 28 may be eccentrically arranged as shown in Figs. 1 and 7 to permit of the adjustment of the crank arm with relation to the connecting members. The axis of the crank shaft is preferably central of the casing and is out of line with the cylinders of both pairs when these cylinders are at the limit of their movement in either direction. Consequently, the lengthwise movement of the pistons in either pair of cylinders will impart movement to the crank shaft, which in turn will impart transverse movement to the pistons of the other pair of cylinders and these pistons, of course, will carry their cylinders with them, thus shifting the latter from one position to the other. The arrangement is such that the crank shaft will make one complete revolution upon each cycle of operations of the meter, that is, each cylinder will be filled and discharged during the rotation of the crank shaft. Connected with the crank shaft and extending through the plate 27 is a register operating shaft 30 which may lead to a meter register of any suitable kind. Inasmuch as the cylinders are of a fixed capacity and are necessarily completely filled and emptied upon each reciprocatory movement of the piston it will be apparent that the liquid passing through the meter will be very accurately measured, and that by counting the movements of the pistons the amount of liquid passing through the meter can be registered.

The operation of the device will be readily understood from the foregoing description and it will be apparent that in Fig. 1 of the drawings the piston 23 of the cylinder 19 is in line with its inlet opening and has been moved through approximately half its movement by the pressure of the liquid entering the cylinder. The cylinder 19ᵇ is in line with its outlet port 18 and the piston in that cylinder is being moved outwardly, thus expelling the liquid therefrom and causing it to pass through the channel 13 in the top plate to the main outlet port 14. The movement of the pistons in the cylinder 19 and 19ᵇ is transmitted through the crank shaft 25 to the pistons of the cylinders 19ª and 19ᶜ and serves to impart transverse movement to those pistons and to the cylinders within which they are mounted, thus moving the cylinder 19ª from a position in which it was in communication with its outlet port 18 to a position in which it will communicate with its inlet port 12, and moving the cylinder 19ᶜ from a position in which it was in communication with its inlet port 12 to a position in which it will communicate with its outlet port 18. As the cylinder 19ª is brought into communication with its inlet port the liquid entering the same will force the piston inwardly, thus causing the contents of the cylinder 19ᶜ to be discharged and also causing the cylinders 19 and 19ᵇ to be shifted transversely to reverse their connections with their inlets and outlets respectively. Inasmuch as the water pressure is maintained in the cylinder 19 until the port 12 is completely closed it will be apparent that this cylinder will be completely filled with liquid when it is shifted into line with its outlet port. It will come into line with its outlet port just prior to the completion of the movement of the piston in the cylinder 19ᵃ and at the same time the cylinder 19ᵇ will be brought into line with its inlet port 12, thus causing the liquid to be expelled from the cylinder 19. This cycle of operations continues so long as the liquid is free to flow through the meter.

If desired, the bottom plate may be provided with openings 31 to permit the casing to be filled with the liquid under pressure which will tend to hold the cylinders firmly on their bearing surfaces and will maintain equal pressure on all moving parts within the casing.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a meter, a casing having a plurality of inlets and outlets arranged in pairs, a plurality of cylinders movably mounted in said casing, each cylinder being adapted when in one position to communicate with the inlet only of one pair and when in another position to communicate with the outlet only of that pair, a piston in each cylinder, said pistons and said cylinders being connected in pairs, and means actuated by said pistons alternately to cause the pistons of one pair to impart movement to the cylinders of another pair.

2. In a meter, a casing, a plurality of cylinders mounted in said casing for movement transversely to their respective axes, said casing having an inlet and an outlet for each cylinder, the inlet being arranged to communicate with said cylinder when the latter is in one position and the outlet being arranged to communicate with said cylinder when the latter is in another position, a piston in each cylinder, and means actuated by said pistons alternately to cause each piston in turn to impart movement to the piston in a second cylinder and to impart transverse movement to a third cylinder.

3. In a meter, a casing having an inlet and an outlet in each side wall thereof, a cylinder slidably engaging each of said side walls for movement alternately into communication with the inlet and outlet of said wall, a piston in each cylinder, and means actuated by said pistons alternately to cause the piston in each cylinder in turn to actuate the piston in the cylinder on the opposite wall and to impart sliding movement to the cylinder on an adjacent wall.

4. In a meter, a casing having an inlet and an outlet in each side wall, a cylinder slidably engaging each side wall of said casing for movement alternately into communication with the inlet and outlet of said wall, the cylinders on opposite walls being connected one to the other for movement in unison and the inlets and outlets in the respective walls being so arranged that when one of said connected cylinders is in communication with its inlet the other of said cylinders will be in communication with its outlet, a piston in each cylinder, the pistons in connected cylinders being connected one to the other, and means actuated by said pistons alternately to cause the movement of the pistons in one pair of cylinders to impart sliding movement to another pair of cylinders.

5. In a meter, a casing having an inlet and an outlet in each side wall, a cylinder slidably engaging each side wall of said casing for movement alternately into communication with the inlet and outlet of said wall, the cylinders on opposite walls being connected one to the other for movement in unison and the inlets and outlets in the respective walls being so arranged that when one of said connected cylinders is in communication with its inlet the other of said cylinders will be in communication with its outlet, a piston in each cylinder, connecting members connecting together the pistons of connected cylinders, said connecting members intersecting one another, and means actuated by said connecting members alternately to cause the longitudinal movement of one of said connecting members to impart transverse movement to the other connecting member.

6. In a meter, a casing having an inlet and an outlet in each side wall, a cylinder slidably engaging each side wall of said casing for movement alternately into communication with the inlet and outlet of said wall, the cylinders on opposite walls being connected one to the other for movement in unison and the inlets and outlets in the respective walls being so arranged that when one of said connected cylinders is in communication with its inlet the other of said cylinders will be in communication with its outlet, a piston in each cylinder, connecting members connecting together the pistons of connected cylinders, said connecting members intersecting one another, and a crank shaft journaled in said casing and connected with said connecting members, whereby the lengthwise movement of one of said connecting members will impart transverse movement to the other of said connecting members.

7. In a meter, a casing comprising side walls, each having therein an inlet channel and an outlet channel, both adapted to communicate with the interior of said casing, a bottom wall having a channel adapted to be connected with a source of supply for liquid under pressure, said channel communicating with the inlet channel in each of said side walls, a top plate having a channel adapted to be connected with the discharge line and communicating with the outlet channel in each of said side walls, a plurality of cylinders slidably mounted within said casing adjacent to the respective side walls thereof, and adapted when in one position to communicate with the inlet channel of the adjacent side wall and when in another position to communicate with the outlet channel of the adjacent side wall, pistons mounted in said cylinders, and means actuated by said pistons alternately to cause the movement of one of said pistons to impart corresponding movement to another piston and to impart sliding movement to another of said cylinders.

8. In a meter, a casing comprising side walls, each having therein an inlet channel and an outlet channel, both adapted to communicate with the interior of said casing, a bottom wall having a channel adapted to be connected with a source of supply for liquid under pressure, said channel communicating with the inlet channel in each of said side walls, a top plate having a channel adapted to be connected with the discharge line and communicating with the outlet channel in each of said side walls, a plurality of cylinders slidably mounted within said casing adjacent to the respective side walls thereof, the cylinders adjacent to opposite side walls being connected one to the other for movement in unison and being so arranged that when one of said cylinders is in communication with the inlet channel in the adjacent side wall it will be out of communication with the outlet channel in said side wall and the cylinder with which it is connected will be in communication with the outlet channel in the corresponding side wall and out of communication with the inlet channel in said corresponding side wall, pistons mounted in said cylinders, and means actuated by said pistons alternately to cause the movement of the pistons in one pair of cylinders to impart transverse movement to the cylinders of another pair.

9. In a meter, a casing comprising four side walls arranged at right angles one to the other, each side wall having an inlet port and an outlet port, a bottom plate having a channel adapted to be connected with a source of liquid supply and communicating with the inlet port in each of said side walls, a top plate having a channel adapted to be connected with the discharge line and communicating with the outlet port in each of said side walls, two pairs of cylinders slidably mounted in said casing and each movable alternately into communication with the inlet and the outlet in one of said side walls, the cylinders of each pair being connected one to the other for movement in unison, the cylinders of each pair being so arranged that when one of them is in communication with its inlet port the other will be in communication with its outlet port, pistons mounted in said cylinders, and means actuated by said pistons alternately to cause the movements of the pistons in one pair of cylinders to reverse the communication between the cylinders of the other pair and their inlet and outlet ports.

10. In a meter, a casing comprising four side walls arranged at right angles one to the other, each side wall having an inlet port and an outlet port, a bottom plate having a channel adapted to be connected with a source of liquid supply and communicating with the inlet port in each of said side walls, a top plate having a channel adapted to be connected with the discharge line and communicating with the outlet port in each of said side walls, two pairs of cylinders slidably mounted in said casing and each movable alternately into communication with the inlet and outlet in one of said side walls, the cylinders of each pair being connected one to the other for movement in unison, the cylinders of each pair being so arranged that when one of them is in communication with its inlet port the other will be in communication with its outlet port, a piston in each of said cylinders, a crank shaft journaled in said casing and connected with each of said pistons whereby the movement of the piston in that cylinder which is in line with its inlet will impart movement to the piston of that cylinder which is in line with its outlet and will impart transverse movement to the other cylinders, to reverse their connections with their inlets and outlets.

11. In a meter, a casing comprising four side walls arranged at right angles one to the other, each side wall having an inlet port and an outlet port, a bottom plate having a channel adapted to be connected with a source of liquid supply and communicating with the inlet port in each of said side walls, a top plate having a channel adapted to be connected with the discharge line and communicating with the outlet port in each of said side walls, two pairs of cylinders slidably mounted in said casing and each movable alternately into communication with the inlet and the outlet in one of said side walls, the cylinders of each pair being connected one to the other for movement in unison, the cylinders of each pair being so arranged that when one of them is in communication with its inlet port the other will be in communication with its outlet port, a piston in each of said cylinders, a crank shaft journaled in said casing and connected with each of said pistons whereby the movement of the piston in that cylinder which is in line with its inlet will impart movement to the other cylinders to reverse their connections with their inlets and outlets, and a register actuating shaft connected with said crank shaft.

12. In a meter, a casing having four side walls, each of said side walls having an inlet and an outlet, a cylinder slidably engaging each of said side walls for movement alternately into communication with the inlet and outlet of said wall, a piston in each cylinder, and means actuated by said pistons alternately to cause the piston in one cylinder to operate the piston in the cylinder engaging the opposite wall and to impart sliding movement to the cylinder engaging an adjacent wall.

In testimony whereof we affix our signatures hereto.

PAUL C. POCOCK.
AUGUSTINE J. POCOCK.